US011843417B2

(12) United States Patent
Zhang et al.

(10) Patent No.: US 11,843,417 B2
(45) Date of Patent: Dec. 12, 2023

(54) PROGRAMMABLE TWO-DIMENSIONAL SIMULTANEOUS MULTI-BEAM OPTICALLY OPERATED PHASED ARRAY RECEIVER CHIP AND MULTI-BEAM CONTROL METHOD

(71) Applicant: ZHEJIANG LAB, Hangzhou (CN)

(72) Inventors: Qiang Zhang, Hangzhou (CN); Hui Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 3 days.

(21) Appl. No.: 18/197,751

(22) Filed: May 16, 2023

(65) Prior Publication Data
US 2023/0291483 A1      Sep. 14, 2023

Related U.S. Application Data

(63) Continuation of application No. PCT/CN2023/071774, filed on Jan. 11, 2023.

(30) Foreign Application Priority Data

Jan. 13, 2022   (CN) .......................... 202210035581.7

(51) Int. Cl.
*H04B 10/60*           (2013.01)
*G02F 1/295*           (2006.01)
(Continued)

(52) U.S. Cl.
CPC ........... *H04B 10/60* (2013.01); *G02F 1/2955* (2013.01); *G02F 1/311* (2021.01); *G02F 1/3131* (2013.01);
(Continued)

(58) Field of Classification Search
CPC ....... H04B 10/60; G02F 1/2955; G02F 1/311; G02F 1/3131; G02F 2201/06;
(Continued)

(56) References Cited

U.S. PATENT DOCUMENTS

| 5,943,636 A * | 8/1999 | Baldwin et al. ....... H04B 10/08 |
| | | 702/85 |
| 10,754,091 B1 | 8/2020 | Nagarajan |
| 2021/0181310 A1 | 6/2021 | Lu et al. |

FOREIGN PATENT DOCUMENTS

| CN | 111722189 A | 9/2020 |
| CN | 112485777 A | 3/2021 |

(Continued)

OTHER PUBLICATIONS

Jia Shi, et al., Research of optical short pulse source with tunable repetition rate and ultra-low timing jitter*, Acta Phys. Sin., 2015, pp. 184201(1-5), vol. 64, No. 18.

*Primary Examiner* — Leslie C Pascal
(74) *Attorney, Agent, or Firm* — Bayramoglu Law Offices LLC

(57) ABSTRACT

A programmable two-dimensional simultaneous multi-beam optically operated phased array receiver chip is manufactured based on silicon-on-insulator (SOI) and indium phosphide (InP) semiconductor manufacturing processes, including the SiN process. The InP-based semiconductor is used for preparing a laser array chip and a semiconductor optical amplifier array chip, the SiN is used for preparing an optical power divider, and the SOI semiconductor is used for preparing a silicon optical modulator, a germanium-silicon detector, an optical wavelength multiplexer, a true delay line, and other passive optical devices. The whole integration of the receiver chip is realized through heterogeneous integration of the InP-based chip and the SOI-based chip. Simultaneous multi-beam scanning can be realized through peripheral circuit programming control. The chip not only can realize two-dimensional multi-beam scanning, but also has strong expansibility, such that the chip can be used for ultra-wideband high-capacity wireless communication and simultaneous multi-target radar recognition systems.

9 Claims, 6 Drawing Sheets

(51) Int. Cl.
*G02F 1/31* (2006.01)
*G02F 1/313* (2006.01)

(52) U.S. Cl.
CPC .... *G02F 2201/06* (2013.01); *G02F 2201/205* (2013.01); *G02F 2201/307* (2013.01); *G02F 2202/10* (2013.01); *G02F 2203/58* (2013.01); *G02F 2203/70* (2013.01)

(58) Field of Classification Search
CPC ......... G02F 2201/205; G02F 2201/307; G02F 2202/10; G02F 2203/58; G02F 2203/70
See application file for complete search history.

(56) References Cited

FOREIGN PATENT DOCUMENTS

| | | | | |
|---|---|---|---|---|
| CN | 111181683 | * | 3/2022 | .......... H04J 14/0213 |
| JP | 9116500 A | * | 2/1997 | ........... H04B 10/152 |

* cited by examiner

PROGRAMMABLE TWO-DIMENSIONAL SIMULTANEOUS MULTI-BEAM OPTICALLY OPERATED PHASED ARRAY RECEIVER CHIP AND MULTI-BEAM CONTROL METHOD

CROSS-REFERENCES TO THE RELATED APPLICATIONS

This application is a continuation application of PCT/CN2023/071774 filed on Jan. 11, 2023, and claims priority to Chinese Patent Application No. 202210035581.7, filed on Jan. 13, 2022, the entire contents of which are incorporated herein by reference.

TECHNICAL FIELD

The present disclosure relates to a programmable two-dimensional simultaneous multi-beam optically operated phased array receiver chip and a multi-beam control method, and in particular, to a variety of photonic integrated chips on different material platforms.

BACKGROUND

With the rapid development of information technology, future warfare develops towards grand deep and three-dimensional battle. Along with the leapfrog improvement of satellite communication technology and artificial intelligence technology, the overall warfare develops towards land-sea-air-space integration, intelligence and multi-platform integration, and has the characteristics of ultra-long range, all-weather applications, rapid response, desirable flexibility and high accuracy. Therefore, highly developed technologies for information acquisition, control and use gain an increasingly important position in the future warfare. As the forward eyes and ears in the war, radar transmission and reception systems play a vital role in this process. Therefore, the broadband reception and processing of radar signals and the ubiquitous sensing and access of information are the hot and difficult problems of radar research.

Fiber optical communication technology, which is the backbone and core of the communication field, has proved its superb broadband data processing capability over decades of development. In addition, conventional microwave technology has shown some capability in ubiquitous sensing and access. Compared with traditional microwave technology, optical communication has advantages of ultra-low loss and anti-electromagnetic interference. Combination of the two technologies gives birth to the microwave photonic technology. With the title "Photonics Illuminates the Future of Radar", the United States Naval Research Laboratory even elevates application of photonics in radar engineering to a very important level. At present, domestic and international research results of the microwave photonic radar technology show that the microwave photonic technology, compared with the traditional microwave signal processing technology, features a large bandwidth and strong flexibility, thereby improving the performance of the entire radar system. However, currently, most microwave photonic radar systems are built based on discrete optical devices or equipment. The development of the microelectronics industry points the way for the development of microwave photonics.

Along with the rapid development of integrated photonics, the integrated microwave photonics developed based on a multi-material platform has laid a solid foundation for miniaturization and generalization of the microwave photonics radar. However, currently, most integrated microwave photonic chips are implemented in a single-material platform, which can only achieve a single function and the system size cannot be further reduced. In addition, most radars use the single antenna structure rather than a phased array antenna structure. Compared with the traditional single antenna or circular antenna radar, the phased array radar has the advantages of high stability, strong flexibility and long detection distance, and its principle is to use coherence of electromagnetic waves and control the phase of the current fed to each radiation unit through the computer, such that the beam direction can be changed for scanning. The conventional phased array radar based on the electric phase shifter causes beam squint, but the problem can be solved by changing the time difference between the antenna elements with the optical true time delay line. At present, integrated optically operated phased array chips based on Silicon on Insulator (SOI), Silicon Nitride (SiN) and Indium Phosphide (InP) have been reported. However, most of the chips can realize one-dimensional single-beam scanning rather than two-dimensional simultaneous multi-beam scanning, which greatly limits their application. In contrast, although the bandwidth of the optically operated phased array chip is narrower, it can realize two-dimensional simultaneous multi-beam scanning, which greatly enhances its functionality and multi-scene application capability. Therefore, two-dimensional simultaneous multi-beam scanning of the optically operated phased array chip not only has the advantages of ultra-wide bandwidth, ultra-low loss and anti-electromagnetic interference, but also enables the multi-functionality of the optically operated phased array chip.

SUMMARY

In order to overcome the shortcomings of the prior art, the present disclosure provides a programmable two-dimensional simultaneous multi-beam optically operated phased array receiver chip, including an InP photonic chip and an SOI photonic chip that are heterogeneously integrated;

the InP photonic chip integrates q distributed feedback (DFB) lasers and q semiconductor optical amplifiers (SOAs), wavelengths of optical signals output by the q DFB lasers are $\lambda_1, \lambda_2, \ldots, \lambda_{q-1}$, and $\lambda_q$, optical output ports of the q DFB lasers are respectively connected to input ports of the q SOAs, the optical signals output by the DFB lasers on the InP photonic chip are amplified by the corresponding SOAs and are input to input ports of corresponding silicon nitride optical power splitters (SiN-OPS) on the SOI photonic chip;

the SOI photonic chip integrates q SiN-OPSs, denoted as $SiN\text{-}OPS_q$, each having 1 stages of 1×2 SiN-based multimode interferometers (SiN-MMIs), each SiN-OPS has $2^1$ output ports, the output port of SiN-OPSq is denoted as SiN-OPSq-Ok, 1<k<2', and k is an integer; each $SiN\text{-}OPS_q\text{-}O_k$ is cascaded with a corresponding silicon modulator; the SOI photonic chip further integrates $2^l$ 1×q SiN-based optical wavelength multiplexers (SiN-WDMs), denoted as SiN-WDMk; each SiN-WDM has q optical input ports connected to the corresponding silicon modulator, and each SiN-WDM has one optical output port for synthesizing q optical signals with different wavelengths into one optical signal for transmission;

the optical output port of each SiN-WDM is cascaded with two different SiN-based optical true time delay lines (SiN-OTTDLs) SiN-OTTDL1 and SiN-OTTDL2; the SiN-OTTDL1 includes m+1 stages of 2×2 silicon nitride optical switches (SiN-OSs) and m stages of delay lines-reference waveguides that are cascaded, both the reference waveguide and the delay line are SiN single-mode waveguides, and delay is realized only by changing a length difference between the reference waveguide and the delay line; and the SiN-OTTDL$_2$ includes n+1 stages of 2×2 SiN-OSs and n stages of delay lines-reference waveguides that are cascaded, and the delay line is a dispersor; and after two stages of delaying through the SiN-OTTDL1 and the SiN-OTTDL2, the optical signal is demodulated into an electrical signal through a germanium silicon photodetector (GeSi-PD) cascaded with an output port of the SiN-OTTDL2, and electrical signals demodulated through k GeSi-PDs are output to a peripheral electrical synthesizer for synthesis.

In a preferred embodiment of the present disclosure, the SiN-WDM is a SiN-based micro-ring resonator, a lattice filter or an arrayed waveguide grating (AWG).

In a preferred embodiment of the present disclosure, the SiN-OPS is preferably implemented using a tree structure based on a 1×2 SiN-based multimode interferometer (SiN-MMI).

In a preferred embodiment of the present disclosure, the SiN-OTTDL1 and the SiN-OTTDL2 are both switch array switching delay lines, and optical switches of the SiN-OTTDL1 and the SiN-OTTDL2 are both 2×2 SiN-OSs based on the Mach-Zehnder structure and the thermo-optic effect; and the SiN-OTTDL1 is a SiN-OTTDL based on a non-dispersive single-mode waveguide and the SiN-OTTDL2 is a SiN-based chirped Bragg grating (SiN-CBG).

In a preferred embodiment of the present disclosure, the SiN-OTTDL1 includes m+1 2×2 SiN-OSs and m pairs of delay lines-reference waveguides, one delay line and one reference waveguide are connected to upper and lower arms between every two 2×2 SiN-OSs, the delay line and the reference waveguide are both SiN single-mode waveguides, and the delay line has a total of $2^m$ delay states; and the SiN-OTTDL2 includes n+1 2×2 SiN-OSs and n pairs of delay lines-reference waveguides, one delay line and one reference waveguide are connected to upper and lower arms between every two 2×2 SiN-OSs, the delay line and the reference waveguide are a SiN-CBG and a SiN single-mode waveguide, and the delay line has a total of $2^n$ delay states.

In a preferred embodiment of the present disclosure, a SiN directional coupler (SiN-DC), a Si-SiN interlayer coupler and a GeSi-PD that are cascaded are integrated with the upper and lower arms of each 2×2 SiN-OS, the SiN-DC couples a portion of optical power from the SiN waveguide and inputs to the GeSi-PD through the Si-SiN interlayer coupler, and the magnitude of a photoelectric current output by the GeSi-PD is observed to monitor an operating state of the SiN-OS.

In a preferred embodiment of the present disclosure, the optical signals output by the DFB lasers on the InP photonic chip are amplified by the corresponding SOAs and are input to the input ports of the corresponding SiN-OPSs on the SOI photonic chip through photonic wire bonding, end-coupling, or flip chip bonding.

In a preferred embodiment of the present disclosure, a Si-based carrier-depletion ring modulator (Si-MRM) includes a SiN waveguide and a Si waveguide-based resonator; the SiN waveguide is used as a BUS waveguide and an optical input and output waveguide of the Si-MRM, the SiN waveguide is coupled with the Si waveguide-based resonator through a Si-SiN waveguide coupling region; a PN junction phase shifter is integrated in the Si waveguide-based resonator, and a radio frequency (RF) signal received by a corresponding antenna array element drives the PN junction phase shifter to modulate an optical carrier input to the Si-MRM, the Si-MRM further integrates a thermo-optic phase shifter, and a voltage is applied to the thermo-optic phase shifter for heating a silicon waveguide, to regulate a resonant wavelength of the Si-MRM to achieve regulation of operating points of the Si-MRM; the Si-SiN waveguide coupling region is a double-layer structure, and an overlapping region or the size of the structure is changed to change a coupling coefficient to regulate a quality factor and operating performance of the Si-MRM.

The present disclosure further provides a multi-beam control method for the above programmable two-dimensional simultaneous multi-beam optically operated phased array receiver chip. The method includes:

1) applying drive currents to all the DFB lasers and SOAs on the InP photonic chip, to enable the DFB lasers to generate optical signals with the wavelengths of $\lambda_1$, $\lambda_2$, ..., $\lambda_{q-1}$, and $\lambda_q$, where the optical signals are amplified by the corresponding SOAs and are coupled into the corresponding SiN-OPSs on the SOI photonic chip;

2) cascading each of k output ports of each SiN-OPS with one Si-MRM, connecting an RF input port of each Si-MRM to an RF output port of an element in a phased array antenna, and modulating a received RF signal to a corresponding optical carrier via the Si-MRM, where a $k^{th}$ output port of SiN-OPS$_q$ is cascaded with Si-MRM$_{kq}$ and a wavelength of a corresponding optical carrier is $\lambda_q$, and the two-dimensional simultaneous multi-beam optically operated phased array receiver chip corresponds to the phased array antenna with k×q elements;

3) inputting to SiN-WDMk modulated optical signals output by Si-MRM$_{k1}$ to Si-MRM$_{kq}$, and delaying a synthesized signal through SiN-OTTDL1k and SiN-OTTDL2k, where SiN-OTTDL1k includes m+1 stages of 2×2 SiN-OSs and m stages of delay lines-reference waveguides that are cascaded, a delay on each stage is determined by a relative delay between the delay line and the reference waveguide, a relative delay on the first stage is $2^0\Delta t$, a relative delay on the second stage is $2^1\Delta t$, a relative delay on an $m^{th}$ stage is $2^{m-1}\Delta t$, the reference waveguide and the delay line are both SiN single-mode waveguides, delay is achieved only by changing a length difference of the SiN single-mode waveguides, and the delay is considered as dispersion-free delay, that is, the optical signals with the wavelengths of $\lambda_1$, $\lambda_2$, ..., $\lambda_{q-1}$, and $\lambda_q$ have the same delay in the delay line; and SiN-OTTDL2k includes n+1 stages of 2×2 SiN-OSs and n stages of delay lines-reference waveguides that are cascaded, a delay on each stage is determined by a relative delay between the delay line and the reference waveguide, the delay line is a dispersor, the relative delay on each stage is regulated by changing the length of the dispersive delay line to regulate a relative delay difference among the optical signals with the wavelengths of $\lambda_1$ to $\lambda_q$, where a relative delay difference between the optical signals with the wavelengths of $\lambda_1$ to $\lambda_q$ on the first stage is $\Delta t$, a relative delay difference between the optical signals with the wavelengths of $\lambda_1$ to $\lambda_q$ on the second stage is $2^1\Delta t$, and a relative delay difference between the optical signals with the wavelengths of $\lambda_1$ to $\lambda_q$ on an nth stage is $2^{n-1}\Delta t$;

4) regulating voltages applied to the thermo-optic phase shifters of the SiN-OS on the SOI photonic chip, to achieve two-dimensional beam scanning of the corresponding phased array antenna; and grouping links of SiN-OTTDL1$_1$ to SiN-OTTDL1$_k$ into multiple combinations, to achieve multi-beam scanning control; and 5) after delaying the optical signals through the two stages of delay lines, demodulating the optical signals into electrical signals through the corresponding GeSi-PDs, and synthesizing the electrical signals through an electrical synthesizer and sending to an external signal processing unit, to complete signal analysis and detection.

This present disclosure adopts the heterogeneous integration technology to design and manufacture a two-dimensional multi-beam optically operated phased array chip based on the InP photonic chip and the SOI photonic chip. The chip not only has the performance advantages such as small size, low power consumption and large bandwidth, but also can realize two-dimensional multi-beam scanning based on the peripheral control circuit and algorithm. Based on this chip architecture, an all-optical integrated two-dimensional simultaneous multi-beam optically operated phased array chip can be finally realized, which truly drives the optically operated phased array radar to miniaturization and practicalization.

DETAILED DESCRIPTION OF THE EMBODIMENTS

The present disclosure is described in further detail below with reference to specific implementations. All the implementations of the present disclosure can be correspondingly combined on the premise that their technical features are not conflicted.

Figure 1:
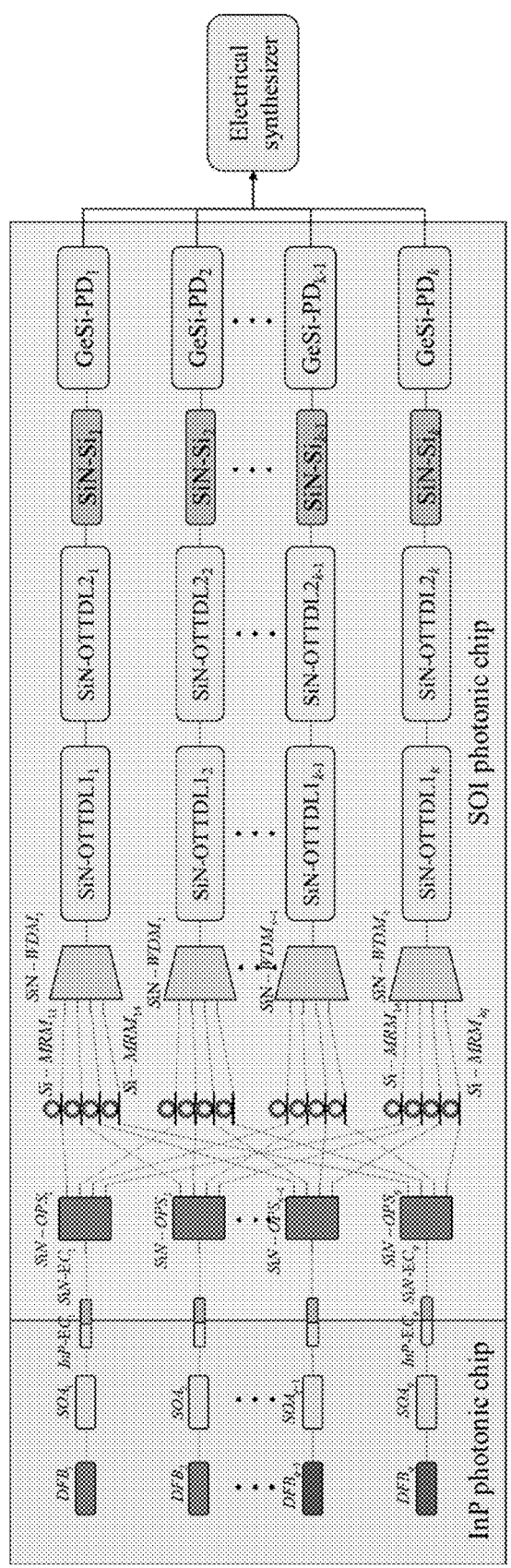
FIG. 1 is an overall schematic diagram of a two-dimensional simultaneous multi-beam optically operated phased array receiver chip according to the present disclosure.

As shown in FIG. 1, a two-dimensional simultaneous multi-beam optically operated phased array receiver chip includes an InP photonic chip and an SOI photonic chip.

The present disclosure adopts the following technical solutions for the InP photonic chip.

An InP-based photonic chip is designed and manufactured, with q DFB lasers and q SOAs integrated on it, denoted as $DFB_1$, $DFB_2$, ..., $DFB_{q-1}$, and $DFB_q$ and $SOA_1$, $SOA_2$, $SOA_{q-1}$, and $SOA_q$.

Wavelengths of optical signals output by $DFB_1$, $DFB_2$, $DFB_{q-1}$, and $DFB_q$ are $\lambda_1$, $\lambda_2$, ..., $\lambda_{q-1}$, and $\lambda_q$ respectively.

Optical output ports of $DFB_1$, $DFB_2$, $DFB_{q-1}$, and $DFB_q$ are connected to input ports of $SOA_1$, $SOA_2$, ..., $SOA_{q-1}$, and $SOA_q$ respectively, that is, an optical signal output by each DFB is amplified and output by a corresponding SOA.

The output port of each SOA is integrated with an InP edge coupler (InP-GC), denoted as $InP\text{-}GC_1$, $InP\text{-}GC_2$, ..., $InP\text{-}GC_{q-1}$, and $InP\text{-}GC_q$, and each InP-GC is used for edge-coupling with the SOI photonic chip.

The present disclosure adopts the following technical solutions for the SOI photonic chip:

The SOI photonic chip is integrated with q silicon nitride edge couplers (SiN-ECs), denoted as $SiN\text{-}EC_1$, $SiN\text{-}EC_2$, $SiN\text{-}EC_{q-1}$, and $SiN\text{-}EC_q$.

A back end of each SiN-EC is cascaded with one SiN-OPS with one stage of 1×2 SiN-MMI, denoted as $SiN\text{-}OPS_q$. Each SiN-OPS has $2^l$ output ports, and an output port of $SiN\text{-}OPS_q$ is denoted as $SiN\text{-}OPS_q\text{-}O_k$ ($1 \leq k \leq 2^l$, and k is an integer).

Each $SiN\text{-}OPS_q\text{-}O_k$ is cascaded with a corresponding silicon modulator, which may be a depletion Mach-Zehnder modulator and micro-ring modulator based on carrier dispersion effects, or a germanium-silicon electroabsorption modulator. To achieve high integration density of the chip, a Si-MRM is preferably used, denoted as $Si\text{-}MRM_{kq}$ (q and l are positive integers, $1 \leq k \leq 2^l$).

The SOI photonic chip integrates $2^l$ 1×q SiN-WDM, denoted as SiN-WDMk ($1 \leq k \leq 2^l$). Each SiN-WDM has q optical input ports, denoted as $SiN\text{-}WDM_{kq}$, and one optical output port, that is, q optical signals with different wavelengths ($\lambda_1$, $\lambda_2$, ..., $\lambda_{q-1}$, and $\lambda_q$) are synthesized into one optical signal for transmission.

Two different SiN-OTTDLs SiN-OTTDL1 and SiN-OTTDL2 are consecutively cascaded after the optical output port of each SiN-WDM, denoted as $SiN\text{-}OTTDL1_k$ and $SiN\text{-}OTTDL2_k$ ($1 \leq k \leq 2^l$).

The $SiN\text{-}OTTDL1_k$ includes m+1 (m is a positive integer) 2×2 SiN-OSs and m pairs of delay lines-reference waveguides, one delay line and one reference waveguide are connected to upper and lower arms between every two 2×2 SiN-OSs, the delay line and the reference waveguide are both SiN single-mode waveguides, and the delay line has a total of $2^m$ delay states.

the $SiN\text{-}OTTDL2_k$ includes n+1 (n is a positive integer) 2×2 SiN-OSs and n pairs of delay lines-reference waveguides, one delay line and one reference waveguide are connected to upper and lower arms between every two 2×2 SiN-OSs, the delay line and the reference waveguide are a SiN-CBG and a SiN single-mode waveguide, and the delay line has a total of $2^n$ delay states.

The 2×2 SiN-OS is of the Mach-Zehnder interferometer structure, including two 2×2 SiN-MMIs and two thermo-optic phase shift arms, and a peripheral control circuit applies a voltage to the thermo-optic phase shift arms to regulate the operating state of 2×2 SiN-OS. In order to monitor the optical switching state in OTTDL, a SiN-DC, a Si-SiN interlayer coupler and a GeSi-PD that are cascaded in sequence are integrated with the upper and lower arms of each 2×2 SiN-OS. The SiN-DC couples a portion (1%-5%) of optical power from the SiN waveguide and inputs to the GeSi-PD through the Si-SiN interlayer coupler, and the magnitude of a photoelectric current output by the GeSi-PD is observed to monitor an operating state of the SiN-OS.

After two stages of delaying through the $SiN\text{-}OTTDL1_k$ and the $SiN\text{-}OTTDL2_k$, the optical signal is demodulated into an electrical signal through a GeSi-PD cascaded with an output port of the $SiN\text{-}OTTDL2_k$, where the GeSi-PD is denoted as GeSi-PDk ($1 \leq k \leq 2^l$).

Electrical signals demodulated through k GeSi-PDs are synthesized into one electrical signal and sent to a peripheral signal processing circuit for signal analysis.

A peripheral control circuit regulates SiN-OS in the corresponding SiN-OTTDL1 and SiN-OTTDL2 on the chip, to perform programmable two-dimensional simultaneous multi-beam scanning control.

The size of the corresponding phased array of this chip is q×k, and up to k 1×q beams can be simultaneously regulated.

Figure 6:
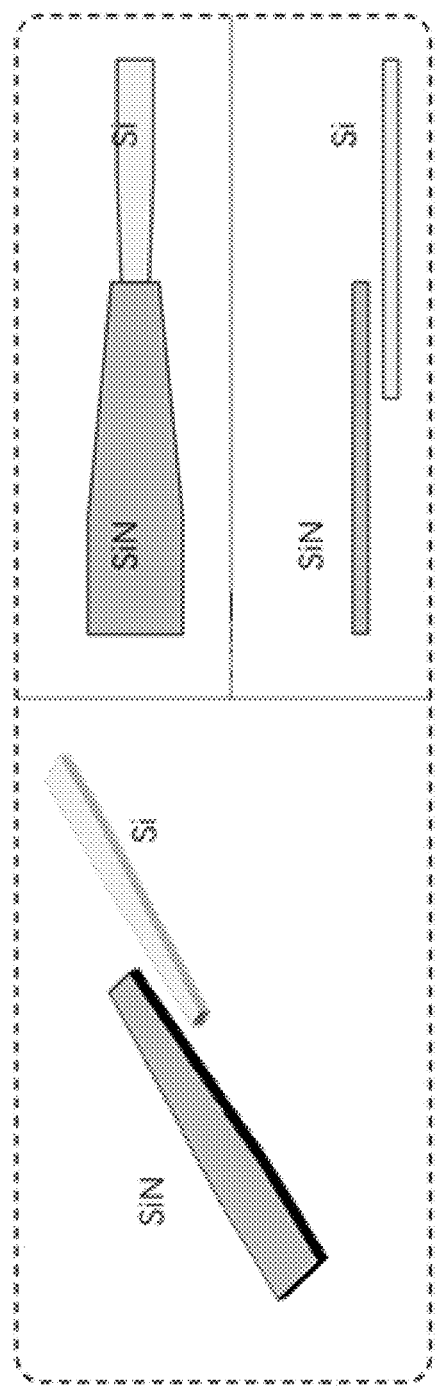
FIG. 6 is a schematic diagram of a Si-SiN transition structure on an SOI photonic chip.

In this embodiment, a three-dimensional schematic diagram of an interlayer coupling structure (SiN-Si interlayer coupler) required for coupling optical signals between SiN-WG and Si-WG is shown in FIG. 6. The SiN-Si interlayer coupler is used to couple the optical signal from the SiN-based optical waveguide into a Si-based optical waveguide or from a Si-based optical waveguide into a SiN-based optical waveguide.

The following describes the multi-beam control process of the present disclosure:

Drive currents are applied to all the DFB lasers ($DFB_1$, $DFB_2$, ..., $DFB_{q-1}$, and $DFB_q$) and SOAs ($SOA_1$, $SOA_2$, ..., $SOA_{q-1}$, and $SOA_q$) on the InP photonic chip, to enable the lasers to generate optical signals with the wavelengths of $\lambda_1$, $\lambda_2$, $\lambda_{q-1}$, and $\lambda_q$, the optical signals are amplified by the corresponding SOAs and coupled into the $SiN-OPS_1$, $SiN-OPS_2$, ..., $SiN-OPS_{q-1}$, and $SiN-OPS_q$ on the SOI photonic chip through InP-GC and SiN-GC on the SOI photonic chip.

As shown in FIG. 1, each of k output ports of each SiN-OPS is cascaded with one Si-MRM, an RF input port of each Si-MRM is connected to an RF output port of an element in a phased array antenna, and a received RF signal is modulated to a corresponding optical carrier via the Si-MRM, where a $k^{th}$ output port of $SiN-OPS_q$ is cascaded with Si-MRM$k_q$ and a wavelength of a corresponding optical carrier is $\lambda_q$. Therefore, the two-dimensional simultaneous multi-beam optically operated phased array receiver chip corresponds to the phased array antenna with k×q elements.

Figure 2:
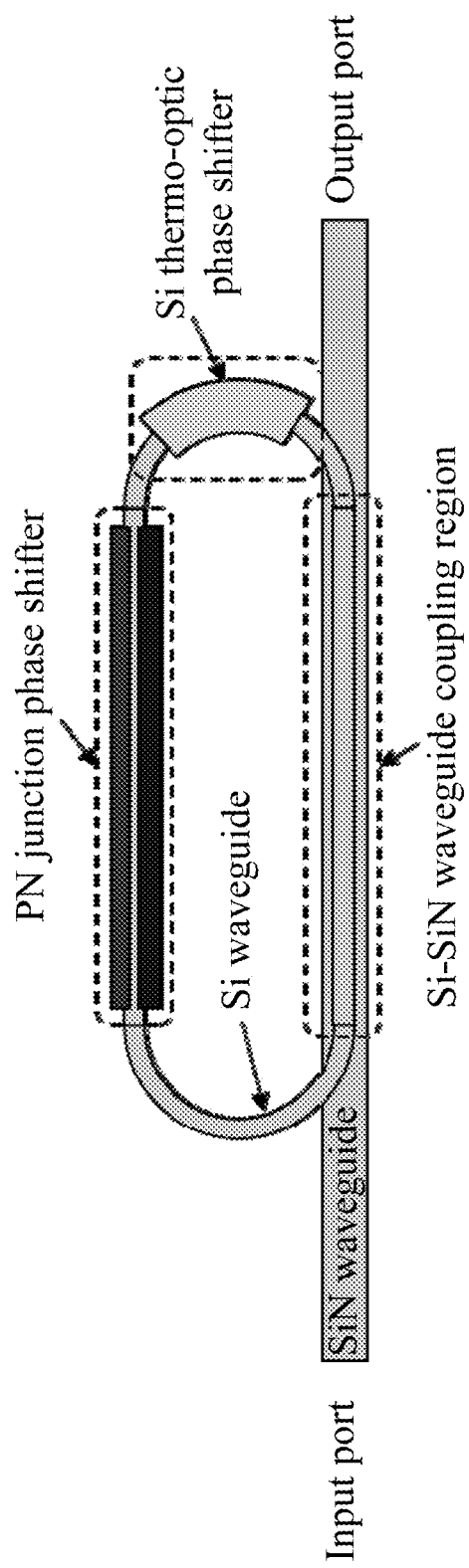
FIG. 2 is a schematic structural diagram of a Si-MRM on an SOI photonic chip.

As shown in FIG. 2, the Si-MRM uses a SiN waveguide as a BUS waveguide and as an input and output port of the Si-MRM A section of PN junction phase shifter is integrated in the Si waveguide-based resonator, and the RF signal received by each antenna array element drives the phase shifter, to modulate a corresponding optical carrier. In addition, the Si-MRM further integrates a thermo-optic phase shifter, and a voltage is applied to the thermo-optic phase shifter for heating a silicon waveguide, to regulate a resonant wavelength of the Si-MRM to achieve regulation of operating points of the Si-MRM The Si-SiN waveguide coupling region is a double-layer structure, and an overlapping region or the size of the structure is changed to change a coupling coefficient to regulate a quality factor and operating performance of the Si-MRM, for example, modulating the depth and the bandwidth. The operating performance of the Si-MRM is regulated according to the external system performance requirements.

As shown in FIG. 1, modulated optical signals output by Si-MRM$_{k1}$ to Si-MRM$_{kq}$ are input to SiN-WDM$_k$, and a synthesized signal is delayed through SiN-OTTDL1$_k$ and SiN-OTTDL2$_k$ sequentially.

Figure 3:
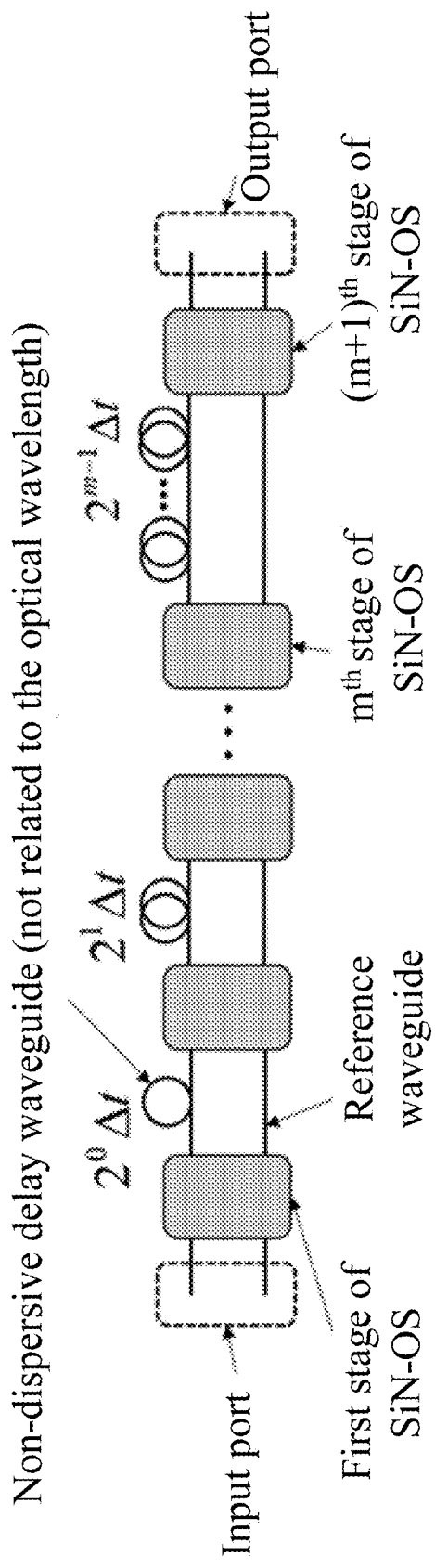
FIG. 3 is a schematic structural diagram of a SiN-OTTDL1 on an SOI photonic chip.

As shown in FIG. 3, SiN-OTTDL1$_k$ includes m+1 stages of 2×2 SiN-OSs and m stages of delay lines-reference waveguides that are cascaded. A delay on each stage is determined by a relative delay between the delay line and the reference waveguide, a relative delay on the first stage is $2^0\Delta t$, a relative delay on the second stage is $2^1\Delta t$, and a relative delay on an $m^{th}$ stage is $2^{m-1}\Delta t$. Herein, both the reference waveguide and the delay line are SiN single-mode waveguides, delay is achieved only by changing a length difference of the SiN single-mode waveguides, and the delay is considered as dispersion-free delay, that is, the optical signals with the wavelengths of $\lambda_1$, $\lambda_2$, ..., $\lambda_{q-1}$, and $\lambda_q$ have the same delay in the delay line.

Figure 4:
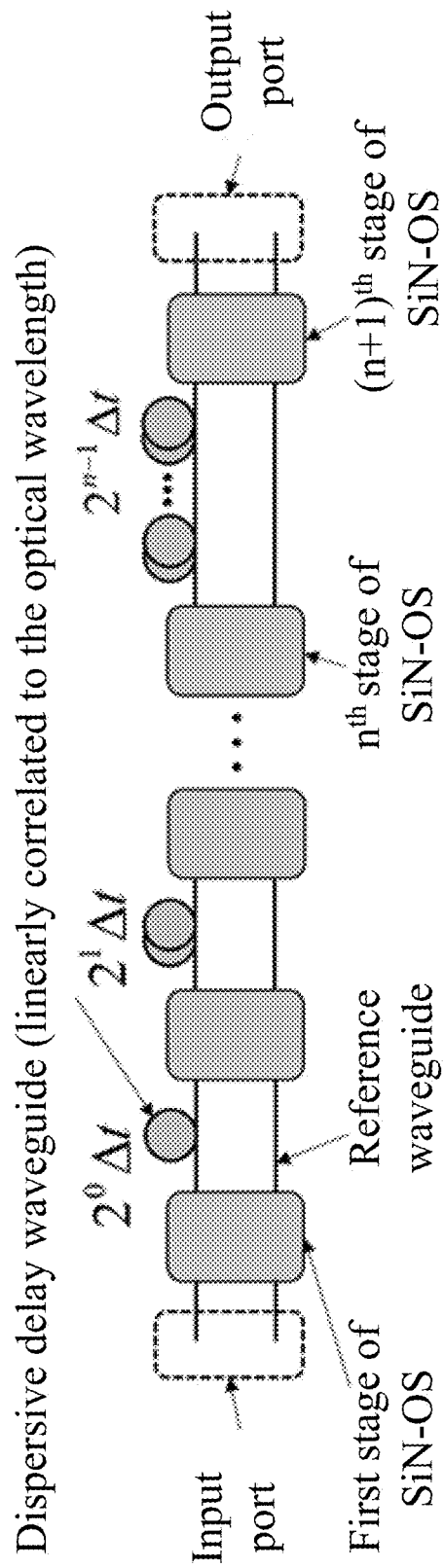
FIG. 4 is a schematic structural diagram of a SiN-OTTDL2 on an SOI photonic chip.

As shown in FIG. 4, SiN-OTTDL2$_k$ includes n+1 stages of 2×2 SiN-OSs and n stages of delay lines-reference waveguides that are cascaded. A delay on each stage is determined by a relative delay between the delay line and the reference waveguide, and the delay line herein is a dispersor (that is, a dispersive line). Two optical signals with a wavelength difference of AA produce a relative delay difference of $\Delta t = \Delta\lambda \times D(\lambda) \times L$ in a dispersive delay line with the length L and the dispersion coefficient $D(\lambda)$. Here, At in SiN-OTTDL2$_k$ is defined as $\lambda t = (\lambda_q - \lambda_1) \times D(\lambda) \times L$, and the unit length of the dispersive delay line is defined as L=1 mm. Herein, the relative delay on each stage is regulated by changing the length of the dispersive delay line to regulate a relative delay difference among the optical signals with the wavelengths of $\lambda_1$ to $\lambda_q$, A relative delay difference between the optical signals with the wavelengths of $\lambda_1$ to $\lambda_q$ on the first stage is $\Delta t$, a relative delay difference between the optical signals with the wavelengths of $\lambda_1$ to $\lambda_q$ on the second stage is $2^1\Delta t$, and a relative delay difference between the optical signals with the wavelengths of $\lambda_1$ to $\lambda_q$ on an $n^{th}$ stage is $2^{n-1}\Delta t$.

Figure 5:
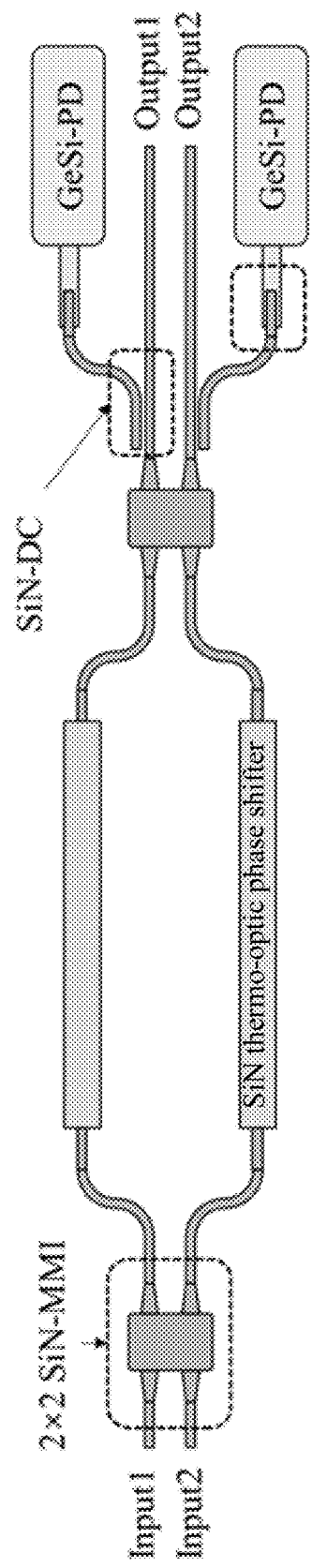
FIG. 5 is a schematic structural diagram of a SiN-OS on an SOI photonic chip.

As shown in FIG. 5, the 2×2 SiN-OS includes two 2×2 SiN-MMIs and two SiN thermo-optic phase shifters that are cascaded. A SiN-DC is integrated with both two output ports of each 2×2 SiN-OS, and the SiN-DC couples a portion (1%-5%) of optical power of the corresponding output port to the GeSi-PD though the SiN-Si transition structure. The voltages applied to the thermo-optic phase shifters on the SiN-OS can be regulated to switch the optical signal between the two ports to achieve delay regulation. In addition, the operating state of the corresponding SiN-OS can be monitored based on the magnitude of the photoelectric current of the corresponding GeSi-PD. When the optical signal is output from the output port of the upper arm of the SiN-OS, that is, when the delay line is taken, the photoelectric current of the GeSi-PD corresponding to the upper arm reaches the maximum, while the photoelectric current of the GeSi-PD corresponding to the lower arm reaches the minimum.

Voltages applied to the thermo-optic phase shifters of the SiN-OS on the SOI photonic chip are regulated, to achieve two-dimensional beam scanning of the corresponding phased array antenna.

The Cartesian coordinate system is used as the standard coordinate system, and a upward direction perpendicular to the antenna array is the Z coordinate. Regulating the operating state of the SiN-OS in SiN-OTTDL1 can regulate the beam scanning in the X-O-Z direction, and regulating the operating state of the SiN-OS in SiN-OTTDL2 can regulate the beam scanning in the Y-O-Z direction.

Links of SiN-OTTDL1$_1$ to SiN-OTTDL1$_k$ are grouped into multiple combinations, to achieve multi-beam scanning control. For example, links of SiN-OTTDL1$_1$ to SiN-OTTDL1$_{k/2}$ are considered as a whole and links of SiN-OTTDL1$_{k/2+1}$ to SiN-OTTDL1$_k$ are considered as a whole, two-dimensional simultaneous two-beam scanning can be realized by regulating the optical switching states of SiN-OSs on the SOI photonic chip.

After delaying the optical signals through the two stages of delay lines, the optical signals are demodulated into electrical signals through the corresponding GeSi-PDs, and the electrical signals are synthesized through an electrical synthesizer and sending to an external signal processing unit, to complete signal analysis and detection.

The above embodiments merely represent several implementations of the present disclosure, and the descriptions thereof are specific and detailed, but they should not be construed as limiting the patent scope of the present disclosure. It should be noted that those of ordinary skill in the art can further make several variations and improvements without departing from the concept of the present disclosure, and all of these fall within the protection scope of the present disclosure. Therefore, the protection scope of the present disclosure shall be subject to the appended claims.

What is claimed is:

1. A programmable two-dimensional simultaneous multi-beam light-operated phased array receiver chip, comprising an indium phosphide (InP) photonic chip and a silicon-on-insulator (SOI) photonic chip that are heterogeneously integrated; wherein the InP photonic chip integrates q distributed feedback (DFB) lasers and q semiconductor optical amplifiers (SOAs), wavelengths of optical signals output by the q DFB lasers are $\lambda_1, \lambda_2, \ldots, \lambda_{q-1}$ and $\lambda_q$, optical output ports of the q DFB lasers are respectively connected to input ports of the q SOAs, the optical signals output by the DFB lasers on the InP photonic chip are amplified by the corresponding SOAs and are input to input ports of corresponding silicon nitride optical power splitters (SiN-OPSs) on the SOI photonic chip;

the SOI photonic chip integrates q SiN-OPSs, denoted as SiN-OPS$_q$, each having l stages of 1×2 SiN-based multimode interferometers (SiN-MMIs), each SiN-OPS has $2^l$ output ports, the output port of SiN-OPSq is denoted as SiN-OPS$_q$-O$_k$, $1 \leq k \leq 2^l$, and k is an integer; each SiN-OPS$_q$-O$_k$ is cascaded with a corresponding silicon modulator; the SOI photonic chip further integrates $2^l$ 1×q SiN-based optical wavelength multiplexers (SiN-WDMs), denoted as SiN-WDM$_k$; each SiN-WDM has q optical input ports connected to the corresponding silicon modulator, and each SiN-WDM has one optical output port for synthesizing q optical signals with different wavelengths into one optical signal for transmission;

the optical output port of each SiN-WDM is cascaded with two different SiN-based optical true time delay lines (SiN-OTTDLs) SiN-OTTDL1 and SiN-OTTDL2; the SiN-OTTDL1 comprises m+1 stages of 2×2 silicon nitride optical switches (SiN-OSs) and m stages of delay lines-reference waveguides that are cascaded, both the reference waveguide and the delay line are SiN single-mode waveguides, and delay is realized only by changing a length difference between the reference waveguide and the delay line; and the SiN-OTTDL2 comprises n+1 stages of 2×2 SiN-OSs and n stages of delay lines-reference waveguides that are cascaded, and the delay line is a dispersor;

the 2×2 SiN-OS comprises two 2×2 SiN-MMIs and two SiN thermo-optic phase shifters that are cascaded, and voltages applied to the thermo-optic phase shifters on the 2×2 SiN-OS are regulated to switch the optical signal between the two ports to achieve delay regulation; and an output port of the SiN-OTTDL2 is cascaded with germanium silicon photodetectors (GeSi-PD), and electrical signals demodulated through $2^l$ GeSi-PDs are output to a peripheral electrical synthesizer for synthesis.

2. The programmable two-dimensional simultaneous multi-beam light-operated phased array receiver chip according to claim 1, wherein each DFB laser has a different wavelength.

3. The programmable two-dimensional simultaneous multi-beam light-operated phased array receiver chip according to claim 1, wherein the SiN-WDM is a SiN micro-ring resonant cavity, a lattice filter, or an arrayed waveguide grating (AWG).

4. The programmable two-dimensional simultaneous multi-beam light-operated phased array receiver chip according to claim 1, wherein the SiN-OTTDL1 and the SiN-OTTDL2 are both switch array switching delay lines, and optical switches of the SiN-OTTDL1 and the SiN-OTTDL2 are both 2×2 SiN-OSs based on the Mach Zendel structure and the thermo-optic effect; and the SiN-OTTDL1 is a SiN-OTTDL based on a non-dispersive single-mode waveguide and the SiN-OTTDL2 is a SiN-based chirped Bragg grating (SiN-CBG).

5. The programmable two-dimensional simultaneous multi-beam light-operated phased array receiver chip according to claim 1, wherein the SiN-OTTDL1 comprises m+1 2×2 SiN-OSs and m pairs of delay lines-reference waveguides, one delay line and one reference waveguide are connected to upper and lower arms between every two 2×2 SiN-OSs, the delay line and the reference waveguide are both SiN single-mode waveguides, and the delay line has a total of $2^m$ delay states; and the SiN-OTTDL2 comprises n+1 2×2 SiN-OSs and n pairs of delay lines-reference waveguides, one delay line and one reference waveguide are connected to upper and lower arms between every two 2×2 SiN-OSs, the delay line and the reference waveguide are a SiN-CBG and a SiN single-mode waveguide, and the delay line has a total of $2^n$ delay states.

6. The programmable two-dimensional simultaneous multi-beam light-operated phased array receiver chip according to claim 5, wherein a SiN directional coupler (SiN-DC), a Si-SiN interlayer transition structure and a GeSi-PD that are cascaded are integrated with the upper and lower arms of each 2×2 SiN-OS, the SiN-DC couples a portion of optical power from the SiN waveguide and inputs to the GeSi-PD through the Si-SiN interlayer transition structure, and the magnitude of a photoelectric current output by the GeSi-PD is observed to monitor an operating state of the SiN-OS.

7. The programmable two-dimensional simultaneous multi-beam light-operated phased array receiver chip according to claim 1, wherein the optical signals output by the DFB lasers on the InP photonic chip are amplified by the corresponding SOAs and are input to the input ports of the corresponding SiN-OPSs on the SOI photonic chip through photonic wire bonding, end-coupling, or flip chip bonding.

8. The programmable two-dimensional simultaneous multi-beam light-operated phased array receiver chip according to claim 1, wherein the silicon modulator is a Si-based carrier-depletion ring modulator (Si-MRM), the Si-MRM comprises a SiN waveguide and a Si waveguide-based resonant cavity; the SiN waveguide is used as a BUS waveguide and an optical input and output waveguide of the Si-MRM, the SiN waveguide is coupled with the Si waveguide-based resonant cavity through a Si-SiN waveguide coupling region; a PN junction phase shifter is integrated in the Si waveguide-based resonant cavity, and a radio frequency (RF) signal received by a corresponding antenna array element drives the PN junction phase shifter to modulate an optical carrier input to the Si-MRM, the Si-MRM further integrates a thermo-optic phase shifter, and a voltage is applied to the thermo-optic phase shifter for heating a silicon waveguide, to regulate a resonant wavelength of the Si-MRM to achieve regulation of operating points of the Si-MRM; the Si-SiN waveguide coupling region is a double-layer structure, and an overlapping region or the size of the structure is changed to change a coupling coefficient to regulate a quality factor and operating performance of the Si-MRM.

9. A multi-beam control method for the chip according to claim 1, comprising:
1) applying drive currents to all of the DFB lasers and SOAs on the InP photonic chip to enable the DFB lasers to generate optical signals with the wavelengths of $\lambda_1, \lambda_2, \ldots, \lambda_{q-1}$, and $\lambda_q$, wherein the optical signals are amplified by the corresponding SOAs and are coupled into the SiN-OPSs on the SOI photonic chip;
2) cascading each of k output ports of each SiN-OPS with one Si-MRM, connecting an RF input port of each Si-MRM to an RF output port of an element in a phased array antenna, and modulating a received RF signal to a corresponding optical carrier via the Si-MRM, wherein a $k^{th}$ output port of $SiN\text{-}OPS_q$ is cascaded with $Si\text{-}MRM_{kq}$ and a wavelength of a corresponding optical carrier is $\lambda_q$, and the two-dimensional simultaneous multi-beam light-operated phased array receiver chip corresponds to the phased array antenna with k×q elements;
3) inputting to $SiN\text{-}WDM_k$ modulated optical signals output by $Si\text{-}MRM_{k1}$ to $Si\text{-}MRM_{kq}$, and delaying a synthesized signal through $SiN\text{-}OTTDL1_k$ and $SiN\text{-}OTTDL2_k$, wherein $SiN\text{-}OTTDL1_k$ comprises m+1 stages of 2×2 SiN-OSs and m stages of delay lines-reference waveguides that are cascaded, a delay on each stage is determined by a relative delay between the delay line and the reference waveguide, a relative delay on the first stage is $2^0\Delta t$, a relative delay on the second stage is $2^1\Delta t$, a relative delay on an $m^{th}$ stage is $2^{m-1}\Delta t$, the reference waveguide and the delay line are both SiN single-mode waveguides, delay is achieved only by changing a length difference of the SiN single-mode waveguides, and the delay is considered as dispersion-free delay, that is, the optical signals with the wavelengths of $\lambda_1, \lambda_2, \ldots, \lambda_{q-1}$, and $\lambda_q$ have the same delay in the delay line; and
$SiN\text{-}OTTDL2_k$ comprises n+1 stages of 2×2 SiN-OSs and n stages of delay lines-reference waveguides that are cascaded, a delay on each stage is determined by a relative delay between the delay line and the reference waveguide, the delay line is a dispersor, the relative delay on each stage is regulated by changing the length of the dispersive delay line to regulate a relative delay difference among the optical signals with the wavelengths of $\lambda_1$ to $\lambda_q$, wherein a relative delay difference between the optical signals with the wavelengths of $\lambda_1$ to $\lambda_q$ on the first stage is $\Delta t$, a relative delay difference between the optical signals with the wavelengths of $\lambda_1$ to $\lambda_q$ on the second stage is $2^1\Delta t$, and a relative delay difference between the optical signals with the wavelengths of $\lambda_1$ to $\lambda_q$ on an nth stage is $2^{n-1}\Delta t$;
4) regulating voltages applied to the thermo-optic phase shifters of the SiN-OS on the SOI photonic chip, to achieve two-dimensional beam scanning of the corresponding phased array antenna; and grouping links of $SiN\text{-}OTTDL1_1$ to $SiN\text{-}OTTDL1_k$ into multiple combinations, to achieve multi-beam scanning control; and
5) after delaying the optical signals through the two stages of delay lines, demodulating the optical signals into electrical signals through the corresponding GeSi-PDs, and synthesizing the electrical signals through an electrical synthesizer and sending to an external signal processing unit, to complete signal analysis and detection.

* * * * *